United States Patent
Boulet et al.

(10) Patent No.: US 10,305,678 B2
(45) Date of Patent: May 28, 2019

(54) IMBALANCED MONTGOMERY LADDER (71) Applicant: SAFRAN IDENTITY & SECURITY, Issy les Moulineaux (FR)

(72) Inventors: Frédéric Boulet, Issy les Moulineaux (FR); Victor Servant, Issy les Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 256 days.

(21) Appl. No.: 15/115,114

(22) PCT Filed: Jan. 29, 2015

(86) PCT No.: PCT/FR2015/050212
§ 371 (c)(1),
(2) Date: Jul. 28, 2016

(87) PCT Pub. No.: WO2015/114264
PCT Pub. Date: Aug. 6, 2015

(65) Prior Publication Data
US 2017/0012769 A1 Jan. 12, 2017

(30) Foreign Application Priority Data

Jan. 29, 2014 (FR) .................................... 14 00234

(51) Int. Cl.
*H04L 29/06* (2006.01)
*H04L 9/00* (2006.01)
(Continued)

(52) U.S. Cl.
CPC ................ *H04L 9/002* (2013.01); *H04L 9/14* (2013.01); *H04L 9/302* (2013.01); *H04L 9/304* (2013.01);
(Continued)

(58) Field of Classification Search
CPC . H04L 9/002; H04L 9/14; H04L 9/302; H04L 9/304
USPC ........................................................... 380/28
See application file for complete search history.

(56) References Cited

U.S. PATENT DOCUMENTS

| 8,345,863 B2 * | 1/2013 | Baek ...................... G06F 7/725 |
| | | 380/28 |
| 2006/0093137 A1 * | 5/2006 | Izu ......................... G06F 7/725 |
| | | 380/30 |

(Continued)

OTHER PUBLICATIONS

Oliveira, "The Montgomery ladder on binary elliptic curves", Apr. 26, 2017, Springer-Verlag, p. 241-258 (Year: 2017).*
(Continued)

*Primary Examiner* — Taghi T Arani
*Assistant Examiner* — Gregory A Lane
(74) *Attorney, Agent, or Firm* — Christensen O'Connor Johnson Kindness PLLC (57) ABSTRACT

The invention relates to a method for securing an electronic device (SC) against attacks via covert channels when the electronic device (SC) implements a Montgomery ladder for calculating the element $A^{\perp}A^{\perp}\ldots{}^{\perp}A$ where A appears k times. A designates an element of an Abelian group with a law $\perp$, and k is a natural number. The method comprises a modified implementation of the Montgomery ladder. The invention also relates to a device (SC), a computer program and a storage medium arranged so as to implement such a method.

7 Claims, 1 Drawing Sheet

(51) Int. Cl.
*H04L 9/14* (2006.01)
*H04L 9/30* (2006.01)
*H04L 9/32* (2006.01)

(52) U.S. Cl.
CPC .......... *H04L 9/3226* (2013.01); *H04L 9/3234* (2013.01); *H04L 9/3249* (2013.01)

(56) References Cited

U.S. PATENT DOCUMENTS

| | | | | |
|---|---|---|---|---|
| 2010/0040225 A1* | 2/2010 | Venelli | ..................... | G06F 7/725 380/28 |
| 2010/0195821 A1* | 8/2010 | Fischer | .................. | G06F 7/725 380/28 |
| 2012/0039461 A1* | 2/2012 | Joye | ........................ | G06F 7/723 380/28 |
| 2012/0207298 A1* | 8/2012 | Meyer | ..................... | G06F 7/725 380/28 |

OTHER PUBLICATIONS

Ciet, M., and Joye, M., "(Virtually) Free Randomization Techniques for Elliptic Curve Cryptography," Lecture Notes in Computer Science 2836: 348-359, Oct. 10, 2003.

Fan, J., et al., "State-of-the-Art of Secure ECC Implementations: a Survey on Known Side-Channel Attacks and Countermeasures," Hardware-Oriented Security and Trust (HOST), 2010 IEEE International Symposium, Jun. 13, 2010, 12 pages.

Fan, J., and Verbauwhede, I., "An Updated Survey on Secure ECC Implementations: Attacks, Countermeasures and Cost," Cryptography and Security: from Theory to Applications, Springer-Verlag Berlin Heidelberg, pp. 265-282, Jan. 1, 2012.

Fumaroli, G., and Vigilant, D., "Blinded Fault Resistant Exponentiation," International Association for Cryptologic Research 20061004:204126, pp. 1-9, Apr. 21, 2006.

Rapport de Recherche Préliminaire dated Nov. 28, 2014, issued in priority French Application No. 1400234, filed Jan. 29, 2014, 7 pages.

International Search Report dated May 21, 2015, issued in corresponding International Application No. PCT/FR2015/050212, filed Jan. 29, 2015, 2 pages.

Written Opinion of the International Searching Authority dated May 21, 2015, issued in corresponding International Application No. PCT/FR2015/050212, filed Jan. 29, 2015, 6 pages.

Written Opinion of the International Searching Authority dated May 21, 2015, issued in corresponding International Application No. PCT/FR2015/050212, filed Jan. 29, 2015, 8 pages.

International Preliminary Report of Patentability dated Aug. 2, 2016, issued in corresponding International Application No. PCT/FR2015/050212, filed Jan. 29, 2015, 1 page.

* cited by examiner

IMBALANCED MONTGOMERY LADDER

The invention relates to the protection of an electronic device implementing a Montgomery ladder, against side-channel attacks.

The Montgomery ladder is commonly used in cryptography. Many encryption, decryption, authentication, authentication verification, electronic signature, or electronic signature verification algorithms rely on the Montgomery ladder.

A cryptographic algorithm is an algorithm that is designed to protect information by using mathematics, for example to ensure its confidentiality, authenticity, or integrity. A cryptographic algorithm is often based on one or more keys, which can be secret, private, or public. Some cryptographic algorithms do not use any keys, which is the case in some hash functions (such as SHA-1, MD5, SHA-256, RIPEMD-160, etc.). Cryptographic algorithms include encryption algorithms (which render information unintelligible) and decryption algorithms (which recover the original information from encrypted information), algorithms for electronic signature, signature verification, authentication, authentication verification, etc. Among the cryptographic algorithms based on keys, some are said to be symmetric (such as DES, 3DES, AES, RC4, HMAC, etc.). Some symmetric algorithms are specialized (for example the HMAC algorithm is used for signing/signature verification but not for encryption/decryption). Symmetric algorithms are so named because they use the same key (generally referred to as a secret key) to encrypt and to decrypt, or to sign and verify a signature, etc. Symmetric cryptographic algorithms thus require both parties using them to secure their key-sharing communications. Other cryptographic algorithms are called asymmetric (for example DSA algorithms, RSA algorithms, elliptic curves, etc.) because a different key is used by the parties of a communication. Each party has a private key and an associated public key. For example, a party may use one of its private keys to sign information, and a corresponding public key is used by the other party to verify the signature; or one party may use a public key belonging to another party to encrypt information, and the other party can then use its corresponding private key to decrypt the information.

Cryptographic algorithms are often described very specifically in specifications which are accessible to everyone, as the security of a cryptographic algorithm is generally not tied to concealing how it operates (algorithms that are presumed secure because their internal operations are kept secret often end up being cracked by reverse engineering). Specifications allow determining what an algorithm must output when certain information is supplied to it. This ensures interoperability of the cryptographic algorithm, meaning that different implementations must be able to work together. For example, one can legitimately expect that information encrypted by any implementation of an encryption algorithm can be decrypted by any implementation of the corresponding decryption algorithm. However, this does not mean there is only one possible implementation of each cryptographic algorithm. On the contrary, many possible implementations of each cryptographic algorithm exist, and there are many different ways to perform the same calculation. For example, to calculate $X^2+2X+1$, one can calculate $X*X$, then $2*X$, then add the two terms and then add 1, or calculate $X+1$, multiply the result by X, then add 1, or calculate $X+1$ and square the result.

One might think that the security of a cryptographic algorithm depends only on its mathematical definition (and on any keys that are used when these keys are secret or private) as reflected in a specification, and not on the exact manner in which it calculates the result defined in the specification. In reality, this is generally not the case. It turns out that the security of a particular implementation of a cryptographic algorithm depends not only on the cryptographic algorithm itself, but also on how it is implemented, and on other factors such as the characteristics of the electronic device responsible for executing it.

It is well known that when an unprotected electronic device executes software implementing a cryptographic algorithm in a "naive" manner, meaning it simply produces the digital result according to specifications (such as an encryption result) from a given input, it is usually possible to apply passive listening to the electronic device and obtain critical information on how the cryptographic algorithm is carried out. This involves a covert channel (unsuspected by a legitimate user of the electronic device) which allows the attacker to eavesdrop. Passive listening has the advantage of being non-invasive. The electronic device is not damaged, and its owner does not necessarily realize an attack has occurred. The device is thus subverted and returned without its owner suspecting that such has occurred, or is simply used in the absence of the owner, or the eavesdropping occurs in the presence of the owner without the owner noticing (for example a module hidden between the electronic device and its power supply). The owner of an electronic device from which a private RSA key has been extracted by an attacker thus does not revoke his pair of RSA keys, as he has no reason to think an attack has occurred. The attacker can freely use the private RSA key until the owner eventually realizes that operations he has not performed (electronic fund transfers or electronic signatures of contracts) are being attributed to him, or that a third party clearly has had access to confidential information (for example a competitor repeatedly submitting bids which only slightly underbid his own).

Passive listening may consist, for example, of analyzing the electromagnetic radiation emitted by the device during execution of the software (for example in the context of a TEMPEST attack, which in general focuses primarily on the capture of CRT displays but can be generalized). The electromagnetic radiation of an electronic device, for example a processor, can form a side channel which is dependent on what the device is currently doing, for example an instruction that the processor is executing or data that the processor is manipulating. It is also possible to analyze other information, such as the instantaneous power consumption (another side channel) of an electronic device, and thus distinguish the tasks being performed based on the amount of power they require. One can also measure the vibrations being emitted (some components are likely to vibrate, and do so differently depending on what they are doing), or temperature variations, etc. (which represent potential side channels).

Passive listening may also include measuring the execution time of certain operations in order to draw conclusions, when these operations are not protected against attacks known as timing attacks. For example, a password verification operation that is unprotected against timing attacks could compare, byte by byte, the bytes of an expected password to a submitted password, and return an error as soon as a differing byte is found. Based on the time it takes the password verification function to respond that the password is wrong, an attacker could then deduce that the first N bytes are correct, and retry a password with a modified byte N+1, and do so until the response time slows a bit, which would indicate that byte N+1 is now correct, then advance to byte N+2, and so on until the complete password is obtained. Thus, to find a password of length K (in bytes), even if the password is robust (dictionary attacks not possible), we drop from an average complexity of $\frac{1}{2}*(2^8)^K$ to an average complexity of $K*2^7$, which is much simpler. To avoid timing attacks, it is possible to ensure that all sensitive operations have a constant execution time, or that the time, although variable, does not provide any information on what has occurred during the operation.

Basic passive listening may simply consist of identifying a particular characteristic based on a given measurement of the targeted electronic device. This is the case for example in SPA (Simple Power Analysis) attacks. For example, in a modular exponentiation carried out in a "naive" implementation of the RSA algorithm, power consumption is very different when a bit of the exponent is 1 (high consumption) and when this bit is 0 (lower consumption). In common implementations, a bit at 1 involves both a squaring operation and a multiplication operation ("square and multiply"), while a bit at 0 only involves a squaring operation. By observing the power consumption during modular exponentiation, it is thus possible to identify the series of 1s and 0s of the exponent which correspond to fluctuations in power consumption. The RSA exponent, if it is a private exponent, is highly confidential data that is a component of the private RSA key, which in general is not supposed to be known to anyone outside of the electronic device. Obtaining someone's signature private key allows signing on that person's behalf, and obtaining his decryption private key allows decrypting his messages.

However, such eavesdropping attacks (simple to implement) are not always effective. More elaborate eavesdropping attacks are known, such as DPA (Differential Power Analysis) attacks, in which an attacker repeatedly executes a cryptographic algorithm and records the results produced each time (for example power consumption history). Next, the attacker performs statistical calculations based on multiple records, and obtains information in a more reliable manner that is more difficult to prevent.

To guard against such attacks, it is possible to protect the electronic device itself. For example, noise can be superimposed when drawing power in order to make such exploits more difficult, power consumption can be smoothed (for example with capacitors), electromagnetic emissions can be reduced by appropriate shielding, etc. It is also possible to use a special internal clock having a randomly varying clock speed, which makes measurements difficult to exploit (the operations of the cryptographic algorithm are then carried out at speeds which keep changing and are thus unknown to the attacker). There are also other techniques, consisting for example of controlling physical and/or logical access to the electronic device. For example, smart cards implementing cryptographic algorithms with a private key generally protect the operations concerned by a PIN code. A person who temporarily steals the smart card, hoping to extract the private key and then return the card to its owner without him noticing, cannot execute the algorithm in question without providing the correct PIN (an informed user knows the code by heart and does not provide it to anyone), and therefore would not be able to carry out the attack.

These countermeasure techniques are useful, but are generally insufficient by themselves because they do not protect against all attack scenarios. Another method of protection is to use a method of securing the cryptographic algorithm, consisting of implementing the algorithm in a manner such that the generated fluctuations (electrical or other) depend as little as possible on the method used (and therefore provide as little information as possible about the method).

For example, it is possible to modify the implementation of an RSA algorithm using a private key, so that it performs operations having the same signature (electric, electromagnetic, etc.) whether a bit is at 1 or at 0 in the private exponent of the private key. For example, a square and multiply is always carried out, but the result of the multiplication operation is used only if the bit is at 1. It is obviously necessary to be very vigilant, and to arrange the implementation to be as symmetrical as possible. For example, if there is a test to check whether the result of the multiplication is to be used, this test must behave in the same manner regardless of the outcome (or as similarly as possible), otherwise passive listening could target this test to determine whether the bit is at 0 or at 1.

The Montgomery ladder is a particularly advantageous technique in this context.

The Montgomery ladder applies to exponentiations (for example modular exponentiation of the RSA algorithm—multiplicative notation), and similarly applies to scalar multiplication (for example in the case of elliptic curves—additive notation).

A brief review of the operation of the Montgomery ladder is given below.

One goal of the Montgomery ladder is to calculate $A^k$ (respectively $k*A$) in a constant time and as independently as possible of the parameters manipulated by the Montgomery ladder, A being a member of an Abelian group with a law that is written multiplicatively (respectively additively).

Let us call $k_i$ the $i^{th}$ bit of k in its binary representation in t bits ($k=\Sigma_{i=0}^{t-1} k_i*2^i$). Let $L_j=\Sigma_{i=j}^{t-1} k_i*2^{i-j}$ and $H_j=L_j+1$.

We have: $L_j=2*L_{j+1}+k_j=L_{j+1}+H_{j+1}+k_j-1=2*H_{j+1}+k_j-2$.

From this we deduce:

$$(L_j, H_j) = \begin{cases} (2*L_{j+1}, L_{j+1} + H_{j+1}) & \text{if } k_j = 0 \\ (L_{j+1} + H_{j+1}, 2*H_{j+1}) & \text{if } k_j = 1 \end{cases}$$

and therefore:

$$(A^{L_j}, A^{H_j}) = \begin{cases} \left((A^{L_{j+1}})^2, A^{L_{j+1}} * A^{H_{j+1}}\right) & \text{if } k_j = 0 \\ \left(A^{L_{j+1}} * A^{H_{j+1}}, (A^{H_{h+1}})^2\right) & \text{if } k_j = 1 \end{cases}$$

The Montgomery ladder is based on the fact that $L_0=k$. As input parameters, it accepts A and $k=(k_{t-1}, \ldots, k_0)_2$. It outputs $A^k$ (in multiplicative notation).

It is implemented as follows, in a basic version (written in pseudocode):

```
R₁←1
R₂←A
for j=t−1 downto 0 do
    if (kⱼ=0) then
        R₂←R₁R₂
        R₁←(R₁)²
    else
        R₁←R₁R₂
        R₂←(R₂)²
return R₁
```

A slightly improved version takes into account the fact that the most significant bit of k is generally equal to 1. With this assumption, the Montgomery ladder can be simplified to:

```
R₁←A
R₂←A²
for j=t−2 downto 0 do
    if (k_j=0) then
        R₂←R₁R₂
        R₁←(R₁)²
    else
        R₁←R₁R₂
        R₂← (R₂)²
return R₁
```

To illustrate the interchangeability of multiplicative notations (in the above example, applicable for example to RSA, Diffie-Hellman, etc.) and additive notations, the same pseudocode can be written in additive notation (A representing for example a point on an elliptic curve):

```
R₁←A
R₂←2*A
for j=t−2 downto 0 do
    if (k_j=0) then
        R₂←R₁+R₂
        R₁←2*R₁
    else
        R₁←R₁+R₂
        R₂←2*R₂
return R₁
```

However, the Montgomery ladder presented above remains potentially susceptible to some forms of side-channel attack.

One possible method of improving security is to modify the above Montgomery ladder to mask sensitive data. It would thus be possible to mask A with a random number, and/or to mask k with a random number. However, such a countermeasure greatly slows down calculations and the Montgomery ladder then has an execution time that is more than doubled.

The invention improves this situation.

According to one aspect of the invention, a method for securing an electronic device against side-channel attacks when the electronic device makes use of a Montgomery ladder to calculate element $A \perp A \perp \ldots \perp A$ where A appears k times, A being an element of an Abelian group with a law $\perp$ and k being a positive integer, comprises a modified implementation of the Montgomery ladder comprising:

/a/ a determination, by a determination circuit of the electronic device, of a first positive integer r1;

/b/ a calculation, by a calculation circuit of the electronic device, of a first parameter $R1=A \perp A \perp \ldots \perp A$ where A appears r1 times;

/c/ a determination, by a determination circuit of the electronic device, of a second positive integer r2;

/d/ a calculation, by a calculation circuit of the electronic device, of a second parameter $R2=A \perp A \perp \ldots \perp A$ where A appears r2 times;

/e/ a calculation, by a calculation circuit of the electronic device, of a positive integer k' from the positive integer k, from the first positive integer r1, and from the second positive integer r2;

/f/ an implementation, by a calculation circuit of the electronic device, of the Montgomery ladder modified to use positive integer k' in place of positive integer k, first parameter $R1=A \perp A \perp \ldots \perp A$ where A appears r1 times in place of a parameter R1=1, and second parameter $R2=A \perp A \perp \ldots \perp A$ where A appears r2 times in place of a parameter R2=A.

This method is advantageous in that it increases the security of the electronic device against side-channel attacks while not degrading performance (computation speed of the electronic device) as much as the countermeasures of the prior art. The method produces the same result as in the prior art (interoperability is thus ensured), but calculates this result differently, in a much more secure manner.

Another aspect of the invention relates to an electronic device arranged to protect against side-channel attacks when making use of a Montgomery ladder to calculate element $A \perp A \perp \ldots \perp A$ where A appears k times, A being a member of an Abelian group with a law $\perp$ and k being a positive integer.

The electronic device comprises a circuit for determining a first positive integer r1.

The electronic device comprises a circuit for calculating a first parameter $R1=A \perp A \perp \ldots \perp A$ where A appears r1 times.

The electronic device comprises a circuit for determining a second positive integer r2.

The electronic device comprises a circuit for calculating a second parameter $R2=A \perp A \perp \ldots \perp A$ where A appears r2 times.

The electronic device comprises a circuit for calculating a positive integer k' from the positive integer k, from the first positive integer r1, and from the second positive integer r2.

The electronic device comprises a circuit for calculating the Montgomery ladder modified to use positive integer k' in place of positive integer k, first parameter $R1=A \perp A \perp \ldots \perp A$ where A appears r1 times in place of a parameter R1=1, and second parameter $R2=A \perp A \perp \ldots \perp A$ where A appears r2 times in place of a parameter R2=A.

This electronic device is advantageous in that it is more secure than electronic devices unprotected from side-channel attacks, while being more efficient (faster) than electronic devices comprising comparable prior art security countermeasures.

One aspect of the invention relates to a computer program comprising a series of instructions which, when executed by a processor, implement the method according to an aspect of the invention.

One aspect of the invention relates to a non-transitory computer readable storage medium, which stores a computer program according to an aspect of the invention.

Other features, objects, and advantages of the invention will become apparent upon reading a description of one of its embodiments.

Figure 1:
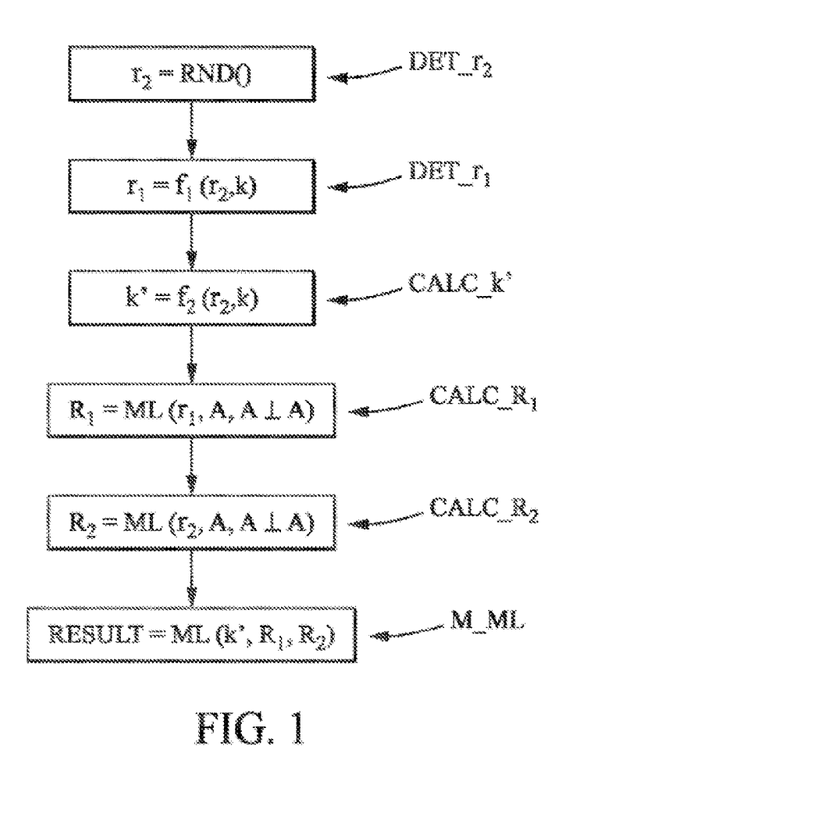
FIG. 1 illustrates a method according to an aspect of the invention.

The invention will also be better understood with the aid of the drawings, in which:

FIG. 1 illustrates a method comprising the following consecutive steps for calculating, in a secure manner, $A \perp A \perp \ldots \perp A$ where A appears k times, A being an element of an Abelian group with a law $\perp$ and k being a positive integer.

During a step DET_r2, an electronic device randomly generates an integer r2.

During a step DET_r1, the electronic device calculates an integer r1=f1(r2, k).

During a step CALC_k', the electronic device calculates an integer k'=f2(r2, k).

During a step CALC_R1, the electronic device calculates $R1=A \perp A \perp \ldots \perp A$ where A appears r1 times, using a Montgomery ladder.

During a step CALC_R2, the electronic device calculates $R2 = A \perp A \perp \ldots \perp A$ where A appears r2 times, using a Montgomery ladder.

During a step M_ML, the electronic device calculates $A \perp A \perp \ldots \perp A$ where A appears k times, using a Montgomery ladder, starting with parameters R1 and R2 (without directly using A) and using the integer k'.

Figure 2:
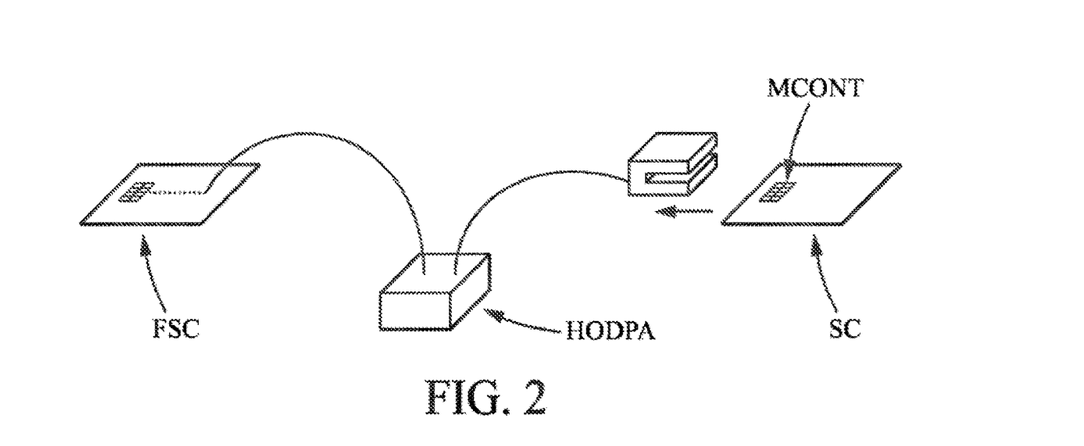
FIG. 2 illustrates an electronic device according to an aspect of the invention, as well as equipment for attempting to attack the electronic device.

FIG. 2 shows a smart card SC according to the invention. A smart card is one possible example of an electronic device in which the invention is particularly advantageous due to its many applications in the field of cryptography (SIM cards authenticating a mobile phone user for a carrier, bank card authenticating the bearer during a financial transaction, health insurance cards, etc.). The smart card SC comprises a microcontroller MCONT equipped with a processor, memory RAM, ROM and EEPROM, with the non-volatile memory (ROM and EEPROM) storing computer programs to operate the smart card.

FIG. 2 also shows a fake smart card FSC, which is in fact only a connector resembling a smart card and having electrical contacts at the standard positions, these contacts being connected to the corresponding contacts of a true smart card SC according to one possible implementation of the invention via HODPA equipment enabling a HODPA type of attack if the smart card is not properly protected. The HODPA equipment is thus serially connected between the true smart card SC targeted by an attacker, and a fake smart card FSC serving as the physical interface between the real smart card SC and a terminal intended to accept the real smart card SC. In this example, the purpose of the fake smart card FSC is to spy on power consumption in the smart card SC without having to modify the terminal where the card is used (and in particular the smart card reader). The smart card SC of the invention is more resistant to attacks of this type and it is very difficult for HODPA equipment to extract the targeted information from the smart card SC.

A first embodiment relates to a method for securing an electronic device SC (such as a smart card) against side-channel attacks. The invention is applicable to any portable device, such as an electronic passport, an electronic visa, an electronic driver's license, a secure USB stick, a secure MMC card, a secure token, etc. The invention may also be implemented in a personal computer, a server, an SSL accelerator, etc. The majority of personal computers is not secure, in comparison with a secure device such as a smart card. This renders these computers vulnerable to attacks that are much simpler to implement than the attacks which the invention protects against, such as purely software-based attacks. These software attacks (viruses, Trojans, etc.) can often be carried out remotely without requiring physical access. It might seem absurd to seek to protect against complex and restrictive passive listening attacks while an attacker on another continent could control the computer remotely and extract critical information in a manner that is much simpler and less dangerous (no intrusion, no theft of a device, etc.). However, some personal computers (for example in military environments) are highly protected against purely software-based attacks, and in this context it is advantageous to protect them against passive listening attacks as well.

Specifically, the method for securing the electronic device protects the device when it uses a Montgomery ladder to calculate element $A \perp A \perp \ldots \perp A$ where A appears k times, A being an element of an Abelian group having a law $\perp$ and k being a positive integer.

If the law $\perp$ is multiplicative (as is the case in the RSA algorithm), the element $A \perp A \perp \ldots \perp A$ where A appears k times can be written as $A^k$, and if it is additive (as is the case in ECC algorithms), it can be written as k*A.

In one possible implementation, A represents unencrypted data (for example a portion of an email, of a document, etc.) that is to be encrypted. This data may have undergone preprocessing to make it unintelligible to a human. In one possible implementation, this preprocessing comprises (or consists of) encoding that is necessary to represent the information (for example the binary representation of a picture, even uncompressed, is not immediately intelligible to a human). In one possible implementation, this preprocessing includes the application of a PKCS#1/OAEP padding scheme. In one possible implementation, this preprocessing comprises a first level of encryption (for example encryption by symmetric session key before encryption by public key). The element $A \perp A \perp \ldots \perp A$ where A appears k times then represents the encrypted information corresponding to the unencrypted information. In one possible implementation, the electronic device applies further processing to element $A \perp A \perp \ldots \perp A$ where A appears k times, in order to obtain the encrypted information.

The method comprises a modified implementation of the Montgomery ladder.

The method includes a determination DET_r1, by a determination circuit of the electronic device SC, of a first positive integer r1. This first positive integer may, for example, be chosen at random (by a pseudo-random number generator, which may be software, hardware, or a combination). Smart cards usually include a pseudo-random number generator based on a hardware component. Such a hardware component makes use, for example, of noise measurement in the component and an analog-to-digital converter. In one possible implementation, the chosen r1 is non-zero.

The method comprises a calculation CALC_R1, by a calculation circuit of the electronic device SC, of a first parameter $R1 = A \perp A \perp \ldots \perp A$ where A appears r1 times. For example, if the law $\perp$ is multiplicative (as is the case in the RSA algorithm), $R1 = A^{r1}$, and if it is additive (as is the case in ECC algorithms), $R1 = r1*A$. Assuming r1 is zero, it is understood that $R1=1$ if the law $\perp$ is multiplicative and $R1=0$ if the law $\perp$ is additive.

The method includes a determination DET_r2, by a determination circuit of the electronic device SC, of a second positive integer r2. This second positive integer may, for example, be chosen at random (by a pseudo-random number generator, which may be software, hardware, or a combination).

The method comprises a calculation CALC_R2, by a calculation circuit of the electronic device SC, of a second parameter $R2 = A \perp A \perp \ldots \perp A$ where A appears r2 times. For example, if the law $\perp$ is multiplicative (as is the case in the RSA algorithm), $R2 = A^{r2}$, and if it is additive (as is the case in ECC algorithms), $R2 = r2*A$. Assuming r2 is zero, it is understood that $R2=1$ if the law $\perp$ is multiplicative and $R2=0$ if the law $\perp$ is additive.

In the general case, r1 and r2 are arbitrary as long as they are different and non-zero. But in some implementations, considered below, certain conditions are imposed on r1 and/or r2 (must be odd, not a multiple of certain values, etc.). For example, the positive integers r1 and r2 may be 32-bit integers.

The method comprises a calculation CALC_k', by a calculation circuit of the electronic device SC, of a positive integer k' from the positive integer k, from the first positive integer r1, and from the second positive integer r2. This positive integer k' is a modified parameter of the Montgomery ladder. For example, in multiplicative notation, k' denotes an exponent replacing the exponent k provided as input.

In one possible embodiment, k' results from dividing $k-2^{n'} \cdot r1$ by $r2-r1$; this division can be Euclidean or modulo the parameter N (which is the cardinality of the Abelian group), n' being a positive integer. In one possible embodiment, in the case of a Euclidean division (according to the previous sentence) that does not result in an integer, the method applies a corrective calculation (such as the corrective calculation in the third embodiment below).

The method further comprises an implementation, by a calculation circuit of the electronic device SC, of a Montgomery ladder M_ML (modified Montgomery ladder) modified to use positive integer k' in place of positive integer k, first parameter $R1 = A \perp A \perp \ldots \perp A$ where A appears r1 times in place of a parameter $R1=1$, and second parameter $R2 = A \perp A \perp \ldots \perp A$ where A appears r2 times in place of a parameter $R2=A$. The method therefore actually comprises the implementation of a Montgomery ladder according to the prior art, but the input parameters are changed.

Thus, instead of carrying out the following steps (in pseudocode):

```
R₁←A
R₂←A⊥A
for j=t-2 downto 0 do
    if (kⱼ=0) then
        R₂←R₁⊥R₂
        R₁←R₁⊥R₁
    else
        R₁←R₁⊥R₂
        R₂←R₂⊥R₂
return R₁
``` the method carries out, for example, the following steps:

```
r₁←random
r₂←random
k'=f(r₁,r₂,k)
R₁←A⊥A⊥...A (r₁ times)
R₂←A⊥A⊥...A (r₂ times)
for j=t'-2 downto 0 do
    if (k'ⱼ=0) then
        R₂←R₁⊥R₂
        R₁←R₁⊥R₁
    else
        R₁←R₁⊥R₂
        R₂←R₂⊥R₂
return R₁
``` k is stored in t bits, and k' is stored in t' bits.

According to one possible implementation, integers r1 and r2 are selected such that they are much shorter than integer k. According to one possible implementation, r1 and r2 are of the same length (coded in the same number of bits). In RSA, k can be coded for example in 1024, 2048, or 4096 bits (more particularly in the case of decryption, signature, or authentication, and more generally in the case of using the private key as opposed to the public key), while r1 and r2 can be coded for example in 16, 32, 64, or 128 bits. These are only some possible examples.

According to a second embodiment, in a securing method according to the first embodiment, a calculation circuit of the electronic device implementing the calculation CALC_R1 of the first parameter and a calculation circuit of the electronic device implementing the calculation CALC_R2 of the second parameter implement these two calculations with a Montgomery ladder. Calculations of $A^{r1}$ and $A^{r2}$ (in multiplicative notation, but the same is true for r1*A and r2*A in additive notation and for any other notation) can thus themselves be protected by a Montgomery ladder. In one possible implementation, this is a prior art Montgomery ladder. But in a possible variant, the modified Montgomery ladder according to the invention is used recursively. For example, each time $A^k$ is to be calculated, the method determines the length of r1 and r2 as being the length of k divided by a given integer (for example 8, 16, or 32) and if the length of r1 (respectively r2) falls below a threshold where the method is no longer useful (for example it seems unnecessary to go below 8 bits in length for r1 or r2), then the method makes use of a conventional Montgomery ladder. By way of illustration, for a calculation where k=4096 ($A^k$ in multiplicative notation), the method generates (in one possible implementation) an r1 and an r2 that are 512-bit, and then for calculating $A^{r1}$ (and similarly for $A^{r2}$), it generates by recursion an r1b and an r2b that are 64-bit, and then for calculating $A^{r1b}$ (and similarly for $A^{r2b}$) it generates r1c/r2c that are 8-bit, and thus we have three levels of recursion.

According to a third embodiment, a securing method according to the first or second embodiment comprises a calculation, by the electronic device SC, of a corrective term.

Indeed, in some cases it is not possible to determine an appropriate integer k', and rather than recalculating a new r1 and/or a new r2, it is possible to determine the nearest satisfactory k' then to calculate a corrective term in order to find a good result.

The method thus comprises the use, by a correction circuit of the electronic device SC, of the corrective term so as to correct the result of the modified implementation of the Montgomery ladder and thus obtain the value of element $A \perp A \perp \ldots \perp A$ where A appears k times.

A fourth embodiment relates to an electronic device SC arranged to protect against side-channel attacks when making use of a Montgomery ladder to calculate element $A \perp A \perp \ldots \perp A$ where A appears k times, A being an element of an Abelian group with a law $\perp$ and k being a positive integer.

This electronic device is arranged to implement a method according to one of the first to third embodiments. Any implementation described in relation to any of the methods according to the invention can be transposed to the corresponding electronic device, and vice versa.

The electronic device SC comprises a determination circuit MCONT for determining a first positive integer r1.

The electronic device SC comprises a calculation circuit MCONT for calculating a first parameter $R1 = A \perp A \perp \ldots \perp A$ where A appears r1 times.

The electronic device SC comprises a calculation circuit MCONT for determining a second positive integer r2.

The electronic device SC comprises a calculation circuit MCONT for calculating a second parameter $R2 = A \perp A \perp \ldots \perp A$ where A appears r2 times.

The electronic device SC comprises a circuit MCONT for calculating a positive integer k' from the positive integer k, from the first positive integer r1, and from the second positive integer r2.

The electronic device SC comprises a circuit MCONT for calculating the Montgomery ladder modified to use positive integer k' in place of positive integer k, first parameter $R1 = A \perp A \perp \ldots \perp A$ where A appears r1 times in place of a parameter $R1=1$, and second parameter $R2 = A \perp A \perp \ldots \perp A$ where A appears r2 times in place of a parameter $R2=A$.

The aforementioned determination circuit and calculation circuits may be separate or may be integrated within a same circuit MCONT such as a microcontroller. Each of these circuits may thus consist of a microprocessor (possibly common to all these circuits) associated with a memory storing a computer program adapted to cause the microprocessor to execute the functions of the circuit concerned. Alternatively, each of these circuits may be a dedicated electronic circuit (FPGA, ASIC, PAL, etc.). Alternatively, some circuits may be dedicated electronic circuits and others may rely on a microprocessor to implement a suitable computer program. All combinations are possible.

According to a fifth embodiment, a calculation circuit for calculating the first parameter and a calculation circuit for calculating the second parameter (these may be two separate circuits or a single circuit) of an electronic device SC according to the fourth embodiment are arranged to implement these two calculations with a Montgomery ladder.

In a sixth embodiment, an electronic device SC according to the fourth or fifth embodiment comprises a calculation circuit MCONT for calculating a corrective term and a correction circuit MCONT arranged to use the corrective term to correct the result of the circuit calculating the modified Montgomery ladder and thus obtain the value of element $A^{\perp}A^{\perp} \ldots {}^{\perp}A$ where A appears k times.

Said calculation circuit and correction circuit may be separate or may be integrated within a same circuit MCONT such as a microcontroller. Each of these circuits may thus consist of a microprocessor (possibly common to these circuits) associated with a memory storing a computer program adapted to cause the microprocessor to execute the functions of the circuit concerned. Alternatively, each of these circuits may be a dedicated electronic circuit (FPGA, ASIC, PAL, etc.). Alternatively, some circuits may be dedicated electronic circuits and others may rely on a microprocessor to implement a suitable computer program. All combinations are possible.

A seventh embodiment relates to a computer program comprising a series of instructions which, when executed by a processor, implement a method according to an embodiment of the invention. The computer program may be written in assembly, in C, or in any other suitable language. The computer program is, in one possible implementation, implemented in the operating system of the electronic device (for example a smart card), and it is written in a low-level language such as one of the two examples given above (assembly language or C), as opposed to a higher level language such as javacard.

An eighth embodiment relates to a non-transitory computer readable storage medium, which stores a computer program according to one of the embodiments. This storage medium may be EEPROM, Flash, ROM or RAM with battery backup, or even magnetic memory or optical memory. This storage medium may also be a device (USB key, memory card such as SD, microSD, etc.) comprising a memory according to the preceding sentence.

One possible method, applied to elliptic curves, comprises the following steps.

The method begins by randomly generating the integer r2.

The method then calculates r1 deterministically, based on r2 and k, using a function f1 (r1=f1(r2, k)).

The method then calculates k'=f2(r2, k) in a similar manner but with a different function f2.

The method then issues three calls to a function implementing the conventional Montgomery ladder (denoted ML), with appropriate parameters:

R1=ML (r1, A, 2.A) (which produces a result R1 equal to r1*A)

R2=ML (r2, A, 2.A) (which produces a result R2 equal to r2*A)

Result=ML (k', R1, R2) (which produces a result R2 equal to k*A)

In one possible variant, we choose:

$$k'=(k-2^{n'} \cdot r1)/(r2-r1)$$

We then have, in multiplicative notation:

$$A^k = ML(k', A^{r1}, A^{r2}) * A^{(k-(2^{n'})*r1) \bmod (r2-r1)}$$

Term $A^{(k-(2^{n'})*r1) \bmod (r2-r1)}$ represents the corrective term.

No corrective term is required if the division performed to calculate k' has no remainder, meaning that k is equal to k'*(r2-r1)+$2^{n'}$*r1.

This variant has a cost (runtime) that is proportional to the length of exponent k plus the length of exponents r1 and r2 (which is the length of k plus two times the length of r1 if r1 and r2 have the same length, for example 32 bits each). The term "exponents" is used loosely here (they are exponents only in multiplicative notation).

In a "modular" variant, k'=(k-$2^{n'}$*r1)*(r2-r1)$^{-1}$ mod N, with r1 and r2 being chosen randomly from among the odd integers.

There is then no need for a corrective term (we have $A^k$=ML(k',$A^{r1}$, $A^{r2}$) directly).

For an elliptic curve, the number of operations required is proportional to the size of the order of the elliptic curve plus two times the length of exponent r1 (r1 and r2 have the same length).

In one possible arithmetic variant (which is particularly effective due to its minimized number of iterations), the method sets the value of r1 so that k-$2^{n'}$*r1 is divisible by r2-r1, to eliminate the corrective term.

This problem can be solved by starting with $A^{r1}$ and $A^{r2+r1}$ (instead of $A^{r1}$ and $A^{r2}$), in other words by changing notation, using r2+r1 instead of r2 for the second exponent.

We are thus looking for: k=($2^{m}$-k')*r1+(r2+r1)*k', which simplifies to: k=$2^{m}$*r1+r2*k'

We are therefore looking for r1 such that (k-$2^{m}$*r1) mod r2=0.

With n' being a positive integer and r2 being odd and random, we have r1=(k*$2^{-n'}$ mod r2), and k'=(k-$2^{m}$*r1)/r2.

Under this hypothesis, no corrective term is required (we have $A^k$=ML(k', $A^{r1}$, $A^{r2}$) directly), and the calculations are shorter because we only need a number of operations proportional to the length of k plus the length of r1.

An arithmetic variant with r2=1 does not provide good protection against attacks because only a small portion of k is hidden. Such a version is therefore generally not recommended.

A modular variant with r1=1 and with r2 being random but odd consists of using k'=(k-$2^{n'}$)*$r2^{-1}$ mod N For an elliptic curve, the number of operations required is proportional to the size of the order of the elliptic curve plus the length of the exponent r2.

A modular variant with r2=1 avoids a modular inverse.

The integer r1 is a random odd number.

We define k'=k-$2^{m}$*r1 mod N For an elliptic curve, the number of operations required is proportional to the size of the order of the elliptic curve plus the length of the exponent r1.

There are no special conditions in the case of RSA, except the conditions of invertibility modulo (p-1)(q-1).

However, for the case of ECC (elliptic curves), one must (where applicable) be careful to avoid the point at infinity during calculations. A few conditions will ensure this. For example, for the arithmetic variant where r1 is fixed (described above), the method can be carried out as follows.

We want r1, r2, k', and n' positive integers such that (s1*k mod N)=$2^{n'}$*r1+s2*r2*k, where s1 and s2 are +1 or −1.

We thus have: k'=(s2*(s1*k mod N))*$r2^{-1}$ mod $2^{n'}$.

and: r1=((s1*k mod N)−s2*r2*k')/($2^{n'}$).

The following constraints can thus be defined:

For $r2^{-1}$ to exist, require r2 to be odd.

For the entropy of r2 to be constant, force its most significant bit to 1 (the most significant bits at 0 are likely to be visible).

To avoid providing information on k, require n' to be independent of k.

For performance reasons, force n' to be as small as possible.

To avoid the point at infinity, require r1 and r2 to be different and non-zero and, for all i within the interval [0 . . . n']:

$$0 \neq (2^i*r1+s2*r2*(k' \bmod 2^i)) \bmod N$$

and $$0 \neq (2^i*r1+s2*r2*((k' \bmod 2^i)+1)) \bmod N$$

It is possible to choose s1 initially as follows.

If k is a multiple of $2^x$ then k' is also a multiple of $2^x$.

To avoid such values of k, initially it is possible to select s1=2*(k mod 2)−1.

The choice of the size and value of r2 can be made as follows. In the case of elliptic curves, for the point at infinity not to appear during the calculations it is sufficient to consider the last round only.

We can require that $0 \neq (2^{n'}*r1+s2*r2*(k'+1))$ mod N.

This is equivalent to saying that $0 \neq (s1*k+s2*r2)$ mod N.

This is always true if r2≠k and r2≠N−k. However, r2 is odd and N is primary therefore odd. Only one among k and N−k is therefore odd. It is therefore sufficient to force one bit of r2 to the complement of the same bit of the odd element.

For example we choose $2^{32}$>r2>$2^{31}$ to have a minimum of 29 entropy bits.

For r1 to be non-zero, (s1*k mod N) must not be divisible by r2. If 0=(s1*k mod N) mod r2 then s1=−s1.

For n' to be minimal while being independent of k, the method can select it so that: N>$2^{n'}$*r2>N/2.

The method can select s2 so that r1 is positive and of a size similar to that of r2: s2=(k−$2^{n'}$*r2)/|k−$2^{n'}$*r2| (meaning that s2 is the sign of k−$2^{n'}$*r2).

Of course, the present invention is not limited to the embodiment described above by way of example; it extends to other variants.

Thus, a method for securing a step of RSA (or ECC) encryption was described above, but it is possible to secure in a similar manner a step of RSA (or ECC) decryption, of RSA (or ECC) authentication, of RSA (or ECC) authentication verification, of RSA (or ECC) signature, of RSA (or ECC) signature verification, and more generally such a step (encryption, decryption, authentication, authentication verification, signature, signature verification, key exchange, etc.) implemented by algorithms other than RSA and ECC (for example Diffie-Hellman, etc.).

In addition, the method of the invention does not exclude the use of other methods. For example, it is possible to combine the method of the invention with other countermeasures.

The invention claimed is:

1. A method for encrypting data for securing an electronic device (SC) against side-channel attacks when the electronic device (SC) implements a Montgomery ladder to calculate element $A \perp A \perp \ldots \perp A$ where A appears k times, A being an element of an Abelian group with a law $\perp$ and k being a positive integer, the method comprising a modified encryption implementation of the Montgomery ladder comprising:

determining (DET_r1), by a determination circuit of the electronic device (SC), a first positive integer r1;

calculating (CALC_R1), by a calculation circuit of the electronic device (SC), a first parameter R1= $A \perp A \perp \ldots \perp A$ where A appears r1 times;

determining (DET_r2), by a determination circuit of the electronic device (SC), a second positive integer r2;

calculating (CALC_R2), by a calculation circuit of the electronic device (SC), a second parameter R2= $A \perp A \perp \ldots \perp A$ where A appears r2 times;

calculating (CALC_k), by a calculation circuit of the electronic device (SC), a positive integer k' from the positive integer k, from the first positive integer r1, and from the second positive integer r2;

implementing (M_ML), by a calculation circuit of the electronic device (SC), the Montgomery ladder modified to use positive integer k' in place of positive integer k, first parameter R1=$A \perp A \perp \ldots \perp A$ where A appears r1 times in place of a parameter R1=1, and second parameter R2=$A \perp A \perp \ldots \perp A$ where A appears r2 times in place of a parameter R2=A.

2. The method of claim 1, wherein:

the calculation circuit of the electronic device implementing the calculation (CALC_R1) of the first parameter, and the calculation circuit of the electronic device implementing the calculation (CALC_R2) of the second parameter are implementing the two respective calculations with the Montgomery ladder.

3. The method according to claim 1, further comprising:

calculating, by the electronic device (SC), a corrective term; and using, by a correction circuit of the electronic device (SC), the corrective term so as to correct the result of the modified implementation of the Montgomery ladder and thus obtaining the value of element $A \perp A \perp \ldots \perp A$ where A appears k times.

4. An electronic device (SC) configured to protect against side-channel attacks using encryption based on a Montgomery ladder to calculate element $A \perp A \perp \ldots \perp A$ where A appears k times, A being an element of an Abelian group with a law $\perp$ and k being a positive integer, the electronic device (SC) comprising:

a circuit (MCONT) configured to determine a first positive integer r1;

a circuit (MCONT) configured to calculate a first parameter R1=$A \perp A \perp \ldots \perp A$ where A appears r1 times;

a circuit (MCONT) configured to determine a second positive integer r2;

a circuit (MCONT) configured to calculate a second parameter R2=$A \perp A \perp \ldots \perp A$ where A appears r2 times;

a circuit (MCONT) configured to calculate a positive integer k' from the positive integer k, from the first positive integer r1, and from the second positive integer r2; and a circuit (MCONT) configured to calculate the Montgomery ladder, modified to use positive integer k' in place of positive integer k, first parameter R1=$A \perp A \perp \ldots \perp A$ where A appears r1 times in place of a parameter R1=1, and second parameter $R2=A^{\perp}A^{\perp} \ldots {}^{\perp}A$ where A appears r2 times in place of a parameter R2=A.

5. The electronic device (SC) of claim 4, wherein the circuit configured to calculate the first parameter, and the circuit configured to calculate the second parameter are arranged to respectively implement these two calculations with the Montgomery ladder.

6. The electronic device (SC) of claim 4, further comprising:
- a calculation circuit (MCONT) configured to calculate a corrective term; and
- a correction circuit (MCONT) arranged to use the corrective term to correct the result of the circuit calculating the modified Montgomery ladder and to thus obtain the value of element $A^{\perp}A^{\perp} \ldots {}^{\perp}A$ where A appears k times.

7. A non-transitory computer readable storage medium whose contents cause a computer to execute a series of instructions for encrypting data according to the method of claim 1.

* * * * *